(12) United States Patent
Ma et al.

(10) Patent No.: US 12,467,843 B2
(45) Date of Patent: Nov. 11, 2025

(54) METHOD FOR PREDICTING SOIL HYDRAULIC PROPERTIES BASED ON UPWARD INFILTRATION EXPERIMENT OF CUTTING RING SOIL SAMPLE

(71) Applicant: Institute of Soil Science, Chinese Academy of Sciences, Nanjing (CN)

(72) Inventors: Donghao Ma, Nanjing (CN); Sicong Wu, Nanjing (CN); Jiabao Zhang, Nanjing (CN); Lianghong Chen, Nanjing (CN)

(73) Assignee: Institute of Soil Science, Chinese Academy of Sciences, Nanjing (CN)

( * ) Notice: Subject to any disclaimer, the term of this patent is extended or adjusted under 35 U.S.C. 154(b) by 484 days.

(21) Appl. No.: 18/080,941

(22) Filed: Dec. 14, 2022

(65) Prior Publication Data

US 2023/0204486 A1    Jun. 29, 2023

(30) Foreign Application Priority Data

Dec. 28, 2021    (CN) .......................... 202111621220.2

(51) Int. Cl.
*G01N 15/08*    (2006.01)
*G01N 33/24*    (2006.01)

(52) U.S. Cl.
CPC .............. *G01N 15/08* (2013.01); *G01N 33/24* (2013.01)

(58) Field of Classification Search
CPC ................................. G01N 15/08; G01N 33/24
See application file for complete search history.

(56) References Cited

PUBLICATIONS

Ma, Donghao et al, "Analytical Method to Determine Soil Hydraulic Properties from Vertical Infiltration Experiments," Soil Science Society of America Journal, published online Nov. 9, 2017 (Year: 2017).*

Latorre, B. et al, "Simultaneous estimation of the soil hydraulic conductivity and the van Genuchten water retention parameters from an upward infiltration experiment," Journal of Hydrology, vol. 572, 2019, pp. 461-469 (Year: 2019).*

* cited by examiner

*Primary Examiner* — Andrew Schechter
*Assistant Examiner* — Ethan Wesley Edwards
(74) *Attorney, Agent, or Firm* — IP Attorneys Group, LLC

(57) ABSTRACT

The present disclosure relates to a method for predicting soil hydraulic properties based on an upward infiltration experiment of a cutting ring soil sample. According to the new design approach, based on an inverse process of one-dimensional water upward infiltration analytical solution of homogeneous dry soils under a boundary condition of a constant pressure, by recording the data regarding cumulative infiltration amounts and infiltration times during the upward infiltration process of the cutting ring soil sample and a time for the wetting front to reach the upper surface of the cutting ring soil sample, a saturated hydraulic conductivity of the cutting ring soil sample is measured, and the soil hydraulic properties are quickly obtained. The present disclosure overcomes the defects that the methods in the prior art for measuring soil hydraulic properties are time consuming, low in efficiency, and not suitable for rapid acquisition of large area in the field, avoids the problems of multiple solutions and non-convergence of parameters, and improves the efficiency of acquiring soil hydraulic properties, thereby providing an effective means for the investigation of soil hydraulic properties in a large area in the field.

6 Claims, 4 Drawing Sheets

| | |
|---|---|
| Step A | During an upward infiltration experiment of a cutting ring soil sample, record a relationship between a cumulative infiltration amount and time, and a time for a wetting front to reach an upper surface of the soil sample, and measure saturated hydraulic conductivity of the cutting ring soil sample |

| | |
|---|---|
| Steps B-D | Obtain a soil pore size distribution index $n$ according to a cumulative infiltration amount when the wetting front reaches the upper surface of the soil sample and an advancing distance of the wetting front |

| | |
|---|---|
| Steps E-G | Obtain a sorptivity s and an air-entry suction value $h_d$ according to $n$ that is already known and the data about the cumulative infiltration amount and time |

FIG. 1

METHOD FOR PREDICTING SOIL HYDRAULIC PROPERTIES BASED ON UPWARD INFILTRATION EXPERIMENT OF CUTTING RING SOIL SAMPLE

CROSS REFERENCE TO RELATED APPLICATION

This patent application claims the benefit and priority of Chinese Patent Application No. 202111621220.2, filed with the China National. Intellectual Property Administration on Dec. 28, 2021, the disclosure of which is incorporated by reference herein in its entirety as part of the present application.

TECHNICAL FIELD

The present disclosure relates to a method for predicting soil hydraulic properties based on an upward infiltration experiment of a soil sample taking with cutting ring, and belongs to the technical field of soil physics and pedohydrology.

BACKGROUND

Soil water retention curves (SWRC) is used as a tool to characterize soil pore structure, and sorptivity is a measure of the capacity of the soil pore structure to absorb liquid. How to obtain soil hydraulic properties (such as SWRC, saturated/unsaturated hydraulic conductivity, and sorptivity) with high accuracy, high speed and less cost is the key to understanding the movement of soil water and fertilizer in the vadose zone. Cutting ring soil sampling and indoor analysis is currently the most effective methods to obtain complete soil hydraulic properties. However, the traditional measurement method requires expensive devices (e.g., pressure membrane meter, suction plate meter, sand box, etc.) to obtain parameters through slow drainage or evaporation processes, and all devices may be affected by the measurement range of water potential, which is time-consuming, laborious and costly, and cannot meet the needs for rapidly collecting sample from a field in a large area.

A prediction method based on the process of water infiltration has been developed as a fast and effective indirect method to estimate the hydraulic properties of cutting ring soil sample since short-distance infiltration can also be measured in details by this method. By improving the performance of numerical algorithms, Moret-Fernández (2017; 2019; 2021) proposed a series of numerical inversion methods based on upward infiltration process to estimate soil hydraulic properties. However, this method is affected by the non-uniqueness of estimated parameters and the non-convergence of numerical solution, which greatly limits the application of the upward infiltration method in the rapid acquisition of soil hydraulic properties in the field. Analytical inverse methods can partially overcome these problems. However, given the complexity of the upward infiltration process, existing analytical upward infiltration models are either too complex (Swartzendruber, 2002) or omits too many process details (Prevedello, 2009; Ogunmokun and Wallach, 2021), making them hard to develop accurate analytical inverse methods. In addition, the patent application (No. 202122414262.0) discloses a portable device for rapid determining soil hydraulic properties in the field, which provides a means to measure the detailed process of water upward infiltration into cutting ring soil sample in the field. However, due to the limitations of current inversion techniques in theory, it is difficult to meet the needs for real-time and efficient overall soil survey in a large area.

SUMMARY

The technical problem to be solved by the present disclosure is to provide a method for estimating soil hydraulic properties based on an upward infiltration experiment of a cutting ring soil sample. Through the water upward infiltration experiment of a cutting ring soil sample, the soil hydraulic properties are quickly estimated, which effectively improve the efficiency of acquiring soil hydraulic properties.

To solve the above technical problems, the present disclosure adopts the following technical solutions: the present disclosure provides a method for estimating soil hydraulic properties based on an upward infiltration experiment of a cutting ring soil sample. The method includes the following steps:

step A: during a one-dimensional water upward infiltration experiment of homogeneous dry soil for the cutting ring soil sample under a boundary condition of a constant pressure $h_p$, recording a change of a cumulative infiltration I of the cutting ring soil sample with infiltration time t, and a time $t_e$ for a wetting front in soil to reach a upper surface of the cutting ring soil sample, measuring a saturated hydraulic conductivity $K_s$ of the cutting ring soil sample, and proceeding to step B;

step B: according to the change of the cumulative infiltration amount I of the cutting ring soil sample with infiltration time t, obtaining a cumulative infiltration amount $I_{te}$, and an advancing distance $z_{fte}$ of the wetting front in soil at a time $t_e$, as well as a ratio of $z_{fte}$ to $I_{te}$, namely, an average soil moisture content increase U in a wetting region of the cutting ring soil sample, and proceeding to step C;

step C: obtaining a shape coefficient a of a soil moisture profile of the cutting ring soil sample based on a saturated soil moisture content $\theta_s$, an initial soil moisture content $\theta_i$ and a residual soil moisture content $\theta_r$ of the cutting ring soil sample, as well as the average soil moisture content increase U in the wetting region of the cutting ring soil sample, and proceeding to step D; and step D: according to the shape coefficient a of the soil moisture profile of the cutting ring soil sample, obtaining a soil pore size distribution index n of the cutting ring soil sample.

Preferably, after step D is executed, the method further includes the following steps:

step E: obtaining an effective saturated hydraulic conductivity $K_e$ of the cutting ring soil sample according to the soil pore size distribution index n of the cutting ring soil sample, the saturated hydraulic conductivity $K_s$ of the cutting ring soil sample, the saturated soil moisture content $\theta_s$, the initial soil moisture content $\theta_i$, and the residual soil moisture content $\theta_r$ of the cutting ring soil sample, and the shape coefficient a of the soil moisture profile of the cutting ring soil sample, and proceeding to step F; and step F: obtaining a sorptivity s of the cutting ring soil sample according to the effective saturated hydraulic conductivity $K_e$ of the cutting ring soil sample, and the change of the cumulative infiltration amount I of the cutting ring soil sample over the infiltration time t.

Preferably, in step E, by substituting the soil pore size distribution index n of the cutting ring soil sample, the saturated hydraulic conductivity $K_s$ of the cutting ring soil sample, the saturated soil moisture content $\theta_s$, the initial soil moisture content $\theta_i$, and the residual soil moisture content $\theta_r$ of the cutting ring soil sample, and the shape coefficient a of the soil moisture profile of the cutting ring soil sample into the following formula:

$$K_e = \frac{(a+1)(\theta_s - \theta_i)}{[(am/n+1)][\theta_s - \theta_i - a(\theta_i - \theta_r)]} K_s$$

the effective saturated hydraulic conductivity $K_e$ of the cutting ring soil sample is obtained, where m=3n+2.

Preferably, in step F, by substituting the effective saturated hydraulic conductivity $K_e$ of the cutting ring soil sample, and the change of the cumulative infiltration amount I of the cutting ring soil sample over the infiltration time t into the following formula:

$$t = -\frac{I}{K_e} - \frac{s^2}{2K_e^2}\ln\left(1 - \frac{2K_e}{s^2}I\right)$$

the sorptivity s of the cutting ring soil sample is obtained through a fitting operation.

Preferably, after step F is executed, the method further includes the following step:

step G: by substituting the sorptivity s of the cutting ring soil sample, the soil pore size distribution index n of the cutting ring soil sample, the saturated soil moisture content $\theta_s$ of the cutting ring soil sample, the initial soil moisture content $\theta_i$ of the cutting ring soil sample, the saturated hydraulic conductivity $K_s$ of the cutting ring soil sample and the constant lower boundary pressure $h_p$ into the following formula:

$$h_d = \begin{cases} \frac{(3n+1)s^2}{2K_s(\theta_s - \theta_i)} & h_p \leq -h_d \\ \frac{m-1}{m}\left(\frac{s^2}{2K_s(\theta_s - \theta_i)} - h_p\right) & h_p > -h_d \end{cases}$$

an air-entry suction value $h_d$ of the cutting ring soil sample is obtained, where m=3n+2.

Preferably, in step C, by substituting the saturated soil moisture content $\theta_s$, the initial soil moisture content $\theta_i$ and the residual soil moisture content $\theta_r$ of the cutting ring soil sample, as well as the average soil moisture content increase U in the wetting region of the cutting ring soil sample into the following formula:

$$a = \frac{\theta_s - \theta_i - U}{\theta_i + U - \theta_r}$$

the shape coefficient a of the soil moisture profile of the cutting ring soil sample is obtained.

Preferably, in step D, according to the shape coefficient a of the soil moisture profile of the cutting ring soil sample, and in combination with the following formula:

$$a = \frac{n(2n+3)}{(2n+2)(2n+1)}$$

the soil pore size distribution index n of the cutting ring soil sample is obtained using a fixed-point iteration method.

Compared with the prior art, the present disclosure adopting the above technical solution achieves the following technical effects:

(1) The present disclosure relates to a method for estimating soil hydraulic properties based on an upward infiltration experiment of a cutting ring soil sample. According to the new design approach, based on an inverse process of one-dimensional water upward infiltration of homogeneous dry soil under a boundary condition of a constant pressure, by recording the data regarding the changes of the cumulative infiltration amount with infiltration time during the upward infiltration experiment of the cutting ring soil sample and a time for the wetting front to reach the upper surface of the cutting ring soil sample, the saturated hydraulic conductivity of the cutting ring soil sample is measured, and the soil hydraulic properties are quickly obtained. The present disclosure overcomes the defects that the methods in the prior art for measuring soil hydraulic properties are time consuming, low in efficiency, and not suitable for rapid acquisition of large area in the field, avoids the problems of multiple solutions and non-convergence of parameters, and improves the efficiency of acquiring soil hydraulic properties, thereby providing an effective means for the investigation of soil hydraulic properties in a large area in the field.

BRIEF DESCRIPTION OF THE DRAWINGS

FIG. 1 is a flowchart of a method for predicting soil hydraulic properties based on an upward infiltration experiment of a cutting ring soil sample according to the present disclosure; FIG. 2A shows a comparison diagram for the cumulative infiltration of a clay soil, FIG. 2B shows a comparison diagram for the cumulative infiltration of a silty soil, and FIG. 2C shows a comparison diagram for the cumulative infiltration of a sandy soil.

DETAILED DESCRIPTION OF THE EMBODIMENTS

Figure 2A:
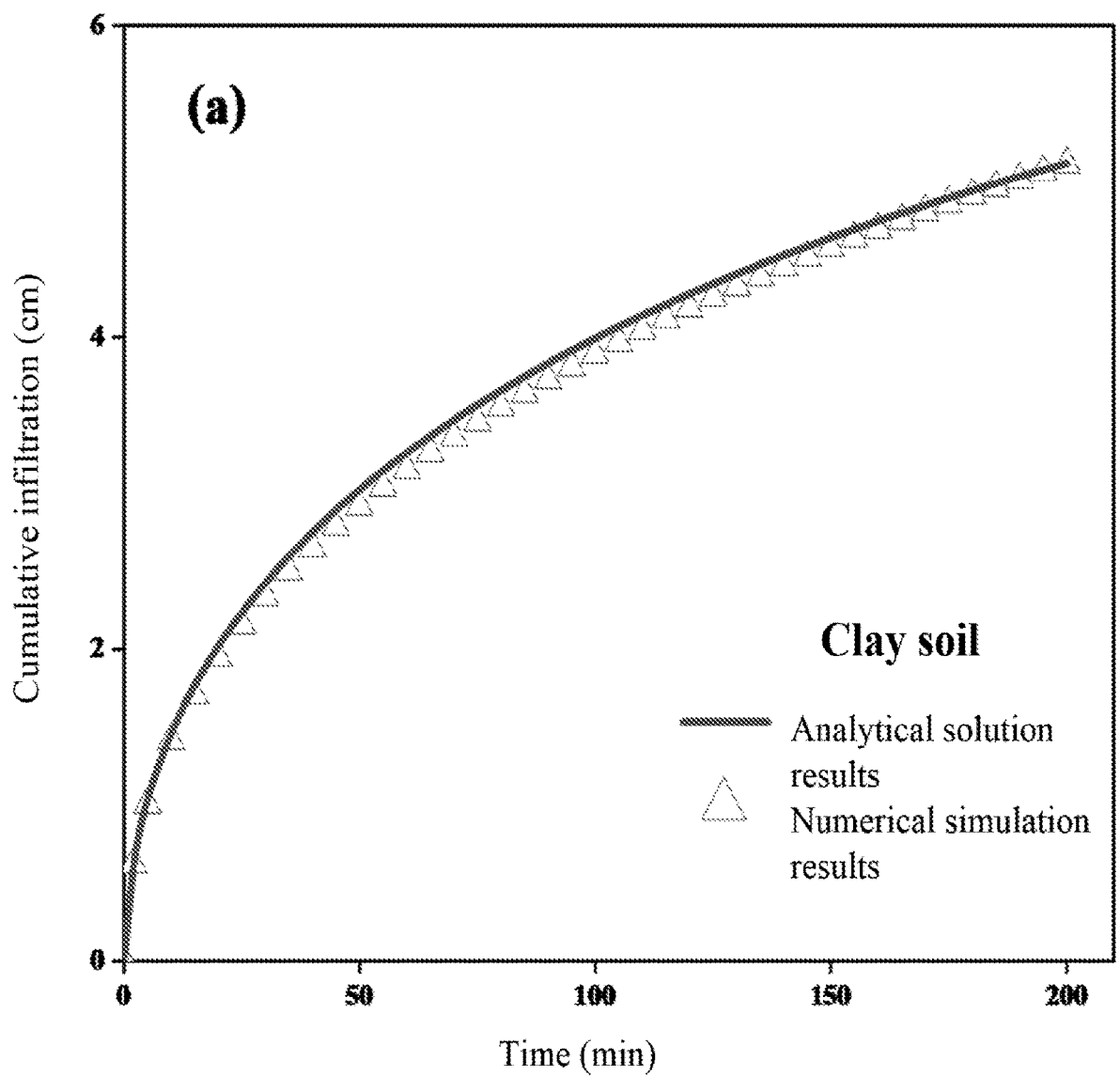
FIGS. 2A, 2B, and 2C show comparison between a cumulative infiltration amount curve simulated by an upward infiltration analytical model and a numerical simulation curve for three kinds of soil, where

The specific implementation of the present disclosure will be further described in detail below with reference to the drawings.

The present disclosure provides a method for predicting soil hydraulic properties based on an upward infiltration experiment of a cutting ring soil sample. Firstly, Richards Equation (1931) and boundary conditions thereof are analyzed as follows:

$$\frac{\partial \theta}{\partial t} = \frac{\partial}{\partial z}\left[K(h)\frac{\partial h}{\partial z} + K(h)\right] \quad (1)$$

$$\theta(z, 0) = \theta_i$$

$$\theta(0, t) = \theta_s$$

$$\theta(\infty, t) = \theta_i$$

The Brooks-Corey model is analyzed to describe the relationships among unsaturated hydraulic conductivity, soil matric potential and soil moisture content as follows:

$$S = \begin{cases} \dfrac{\theta - \theta_r}{\theta_s - \theta_r} = \left|\dfrac{h_d}{h}\right|^n, & h < -h_d \\ 1, & h \geq -h_d \end{cases} \quad (2)$$

$$K(h) = K_s \left|\dfrac{h_d}{h}\right|^m = K_s \left(\dfrac{\theta - \theta_r}{\theta_s - \theta_r}\right)^{\frac{m}{n}} \quad (3)$$

Where h denotes a soil matric potential (cm).

Through the principle of least action, flux-concentration assumption and mean value theorem of integrals, a profile equation describing soil water upward infiltration is obtained, where the flux-concentration assumption and mean value theorem of integrals are used to simplify the functional form of the profile equation, and the flux-concentration assumption is expressed as follows (Philip, 1973):

$$F(\theta) = \dfrac{J_w + K_i}{J_{w0} + K_i} = \dfrac{S - S_i}{1 - S_i} \quad (4)$$

Where $J_{wo}$ denotes a water flux density (cm min$^{-1}$) at a water inlet, $J_w$ denotes a soil water flux density (cm min$^{-1}$), and $K_i$ denotes an unsaturated hydraulic conductivity (cm min$^{-1}$) corresponding to an initial soil moisture content; the meanings of other parameters are denoted above.

Based on the principle of mass conservation and profile equation, complete analytical models (6)-(8) describing one-dimensional water upward infiltration of homogeneous dry soil under a boundary condition of a constant pressure are derived.

The principle of mass conservation is used to obtain the functional relationship between the cumulative infiltration amount I and the infiltration time t, and specifically, the principle of mass conservation is physically expressed as follows:

$$J_{w0} = \dfrac{dI}{dt} \quad (5)$$

$$S = \dfrac{\theta - \theta_r}{\theta_s - \theta_r} = \left(1 - \left(1 - S_i^{\frac{1}{a}}\right)\dfrac{z}{z_f}\right)^a \quad (6)$$

$$t = -\dfrac{I}{K_e} - \dfrac{s^2}{2K_e^2}\ln\left(1 - \dfrac{2K_e}{s^2}I\right) \quad (7)$$

$$I = U z_f \quad (8)$$

Where, $$U = \dfrac{\theta_s - \theta_i - a(\theta_i - \theta_r)}{a + 1} \quad (9)$$

$$s^2 = 2K_e(\theta_s - \theta_i)(h_p - H_f) \quad (10)$$

$$a = \dfrac{n(2n + 3)}{(2n + 2)(2n + 1)} \quad (11)$$

$$-K_e = \dfrac{(a + 1)(\theta_s - \theta_i)}{[(am/n + 1)[\theta_s - \theta_i - a(\theta_i - \theta_r)]} K_s \quad (2)$$

$$H_f = \begin{cases} -\dfrac{(am/n + 1)[\theta_s - \theta_i - a(\theta_i - \theta_r)]}{(a + 1)(\theta_s - \theta_i)(m - 1)} h_d & h_p \leq -h_d \\ h_p - \dfrac{(am/n + 1)[\theta_s - \theta_i - a(\theta_i - \theta_r)]}{(a + 1)(\theta_s - \theta_i)} \left(\dfrac{m}{m - 1} h_d + h_p\right) & h_p > -h_d \end{cases} \quad (13)$$

Based on the foregoing formulas (6)-(13), the present disclosure provides a method for predicting soil hydraulic properties based on an upward infiltration experiment of a cutting ring soil sample. In practical application, as shown in FIG. 1, step A to step G are executed as follows to predict soil hydraulic properties of the cutting ring soil sample.

step A: During a one-dimensional water upward infiltration experiment of a homogeneous dry soil for the cutting ring soil sample under a boundary condition of a constant pressure $h_p$, record the change of the cumulative infiltration amount I of the cutting ring soil sample over infiltration time t, and a infiltration time $t_e$ for the wetting front in soil to reach the upper surface of the cutting ring soil sample, measure a saturated hydraulic conductivity $K_s$ of the cutting ring soil sample, and proceed to step B.

step B: According to the change of the cumulative infiltration amount I of the cutting ring soil sample over the infiltration time t, obtain a cumulative infiltration amount $I_{te}$, and an advancing distance $z_{fte}$ of the wetting front in soil at the time $t_e$, as well as a ratio of $z_{fte}$ to $I_{te}$, ie, an average soil moisture content increase U in the wetting region of the cutting ring soil sample, and proceed to step C.

step C: By substituting the saturated soil moisture content $\theta_s$, the initial soil moisture content $\theta_i$ and the residual soil moisture content $\theta_r$ of the cutting ring soil sample, as well as the average soil moisture content increase U in the wetting region of the cutting ring soil sample into the following formula:

$$a = \dfrac{\theta_s - \theta_i - U}{\theta_i + U - \theta_r} \quad (14)$$

obtain the shape coefficient a of the soil moisture profile of the cutting ring soil sample, and proceed to step D.

step D: According to the shape coefficient a of the soil moisture profile of the cutting ring soil sample, and in combination with the following formula:

$$a = \dfrac{n(2n + 3)}{(2n + 2)(2n + 1)} \quad (15)$$

obtain the soil pore size distribution index n of the cutting ring soil sample using a fixed-point iteration method, and proceed to step E.

step E: By substituting the soil pore size distribution index n of the cutting ring soil sample, the saturated hydraulic conductivity $K_s$ of the cutting ring soil sample, the saturated soil moisture content $\theta_s$, the initial soil moisture content $\theta_i$, and the residual soil moisture content $\theta_r$ of the cutting ring soil sample, and the shape coefficient a of the soil moisture profile of the cutting ring soil sample into the following formula:

$$K_e = \dfrac{(a + 1)(\theta_s - \theta_i)}{[(am/n + 1)[\theta_s - \theta_i - a(\theta_i - \theta_r)]} K_s \quad (16)$$

the effective saturated hydraulic conductivity $K_e$ of the cutting ring soil sample is obtained (m=3n+2), and proceed to step F.

step F: By substituting the effective saturated hydraulic conductivity $K_e$ of the cutting ring soil sample, and the change of the cumulative infiltration amount I of the cutting ring soil sample over the infiltration time t into the following formula:

$$t = -\frac{I}{K_e} - \frac{s^2}{2K_e^2}\ln\left(1 - \frac{2K_e}{s^2}I\right) \quad (17)$$

the sorptivity s of the cutting ring soil sample is obtained through a fitting operation. Then proceed to step G.

step G: By substituting the sorptivity s of the cutting ring soil sample, the soil pore size distribution index n of the cutting ring soil sample, the saturated soil moisture content $\theta_s$ of the cutting ring soil sample, the initial soil moisture content $\theta_i$ of the cutting ring soil sample, the saturated hydraulic conductivity $K_s$ of the cutting ring soil sample and the constant lower boundary pressure $h_p$ into the following formula:

$$h_d = \begin{cases} \frac{(3n+1)s^2}{2K_s(\theta_s - \theta_i)} & h_p \le -h_d \\ \frac{m-1}{m}\left(\frac{s^2}{2K_s(\theta_s - \theta_i)} - h_p\right) & h_p > -h_d \end{cases} \quad (18)$$

an air-entry suction value $h_d$ of the cutting ring soil sample is obtained, where m=3n+2.

Figure 2B:
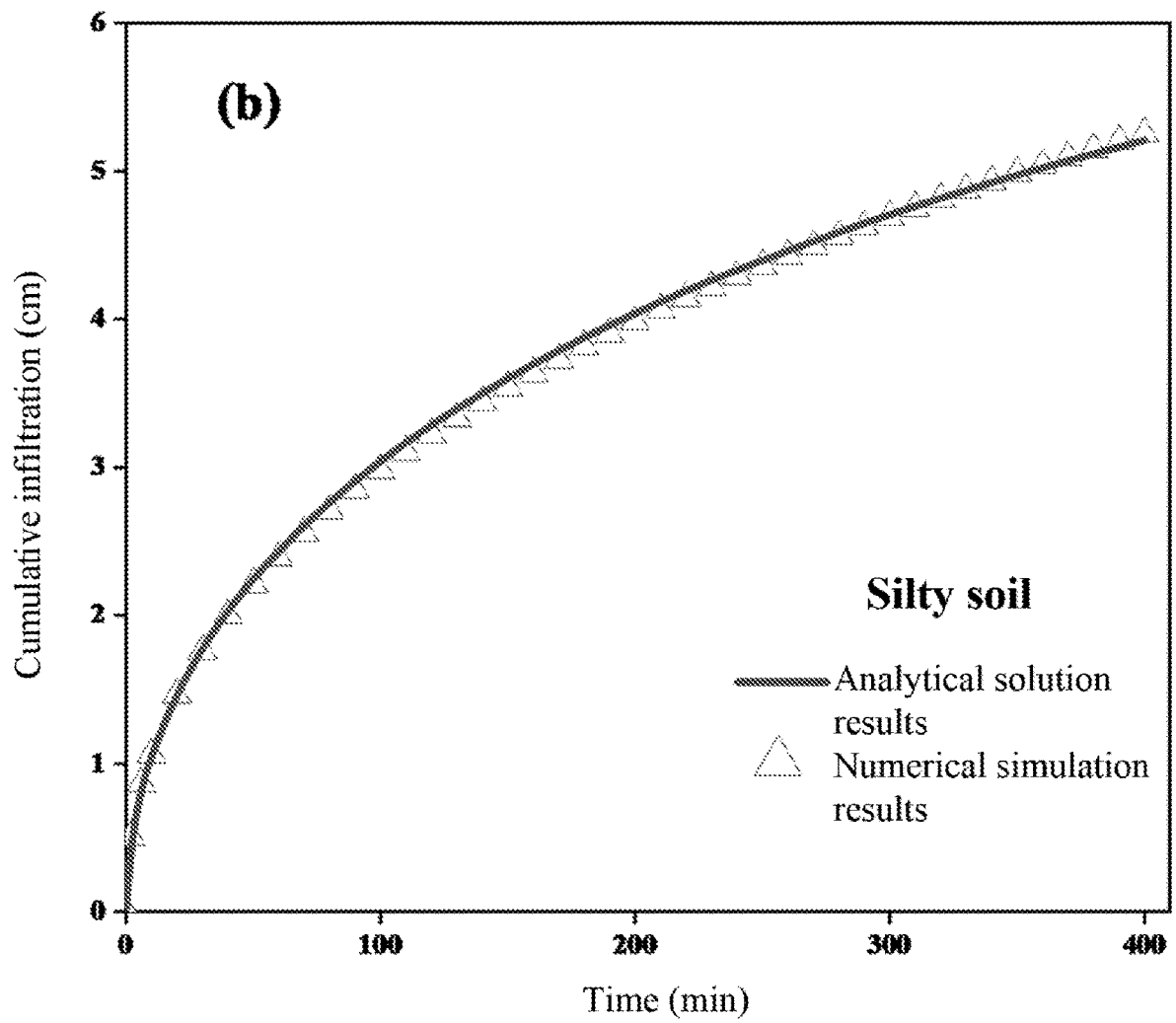
Figure 2C:
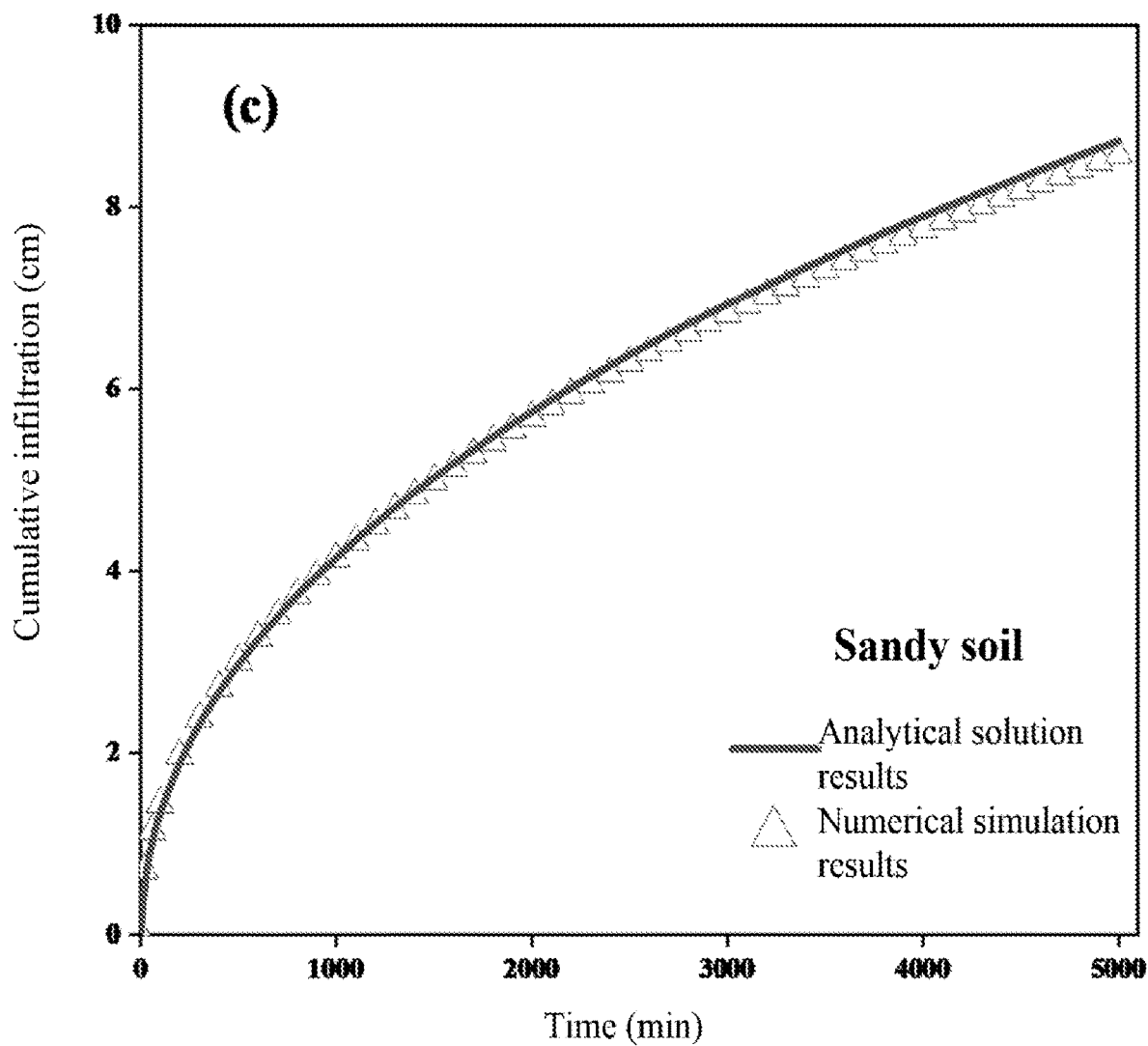

In order to verify the accuracy of the upward infiltration analytical model, FIGS. 2A, 2B and 2C respectively show the difference between the cumulative infiltration amount curve simulated by analytical solution and the numerical solution of formula (1) for three typical soil textures (see Table 1 for soil hydraulic properties). It can be seen from the curve diagrams that the analytical solution results are almost consistent with the numerical simulation results, the relative errors between them are 2.17%, 1.12% and 1.56% respectively, and determination coefficients are 0.996, 0.999 and 0.998 respectively. Therefore, the upward infiltration analytical model can accurately simulate the upward infiltration for different soil textures, which provides a theoretical basis for obtaining corresponding hydraulic parameters.

When the present disclosure is applied to practice, the following three typical soil textures (see Table 1 for soil hydraulic properties) and soil sample test cases with different ring cutter heights are used to further illustrate the method for quickly estimating soil hydraulic properties based on the water upward infiltration experiment.

TABLE 1

| Soil texture | $\theta_r$ cm³ cm⁻³ | $\theta_s$ cm³ cm⁻³ | $\theta_i$ cm³ cm⁻³ | $h_d$ cm | n | m | s cm min⁻⁰·⁵ |
|---|---|---|---|---|---|---|---|
| Sandy soil | 0.041 | 0.453 | 0.065 | 14.66 | 0.322 | 2.966 | 0.4759 |
| Silty soil | 0.015 | 0.501 | 0.02 | 20.75 | 0.211 | 2.633 | 0.3742 |
| clay soil | 0.09 | 0.475 | 0.121 | 37.31 | 0.131 | 2.393 | 0.1413 |

Note: the meanings of the parameters in this Table are denoted above.

(1) In case where a ring cutter has a height of 5 cm, and a soil sample is in a texture of clay soil, set a lower boundary pressure to −37.31 cm in a one-dimensional water upward infiltration experiment.

Based on the above calculation parameters, the calculation process of soil hydraulics properties is as follows.

Step A: During a one-dimensional water upward infiltration experiment for a clay soil sample under a boundary condition of a constant pressure, record data about the cumulative infiltration amount and infiltration time, a time $t_e$=7800 s for the wetting front to reach the upper surface of the soil sample, and measure a saturated hydraulic conductivity $K_s$=0.001 cm min⁻¹ of the soil sample.

Steps B-D: According to the time for the wetting front to reach the upper surface of the soil sample, query the data about the cumulative infiltration amount and infiltration time to obtain a cumulative infiltration amount $I_{te}$=1.536 cm and an advancing distance $z_{fte}$=5 cm of the wetting front, obtain U=0.307 according to formula (8), obtain α=0.139 according to formula (14), and obtain the soil pore size distribution index (0.120) of the soil sample according to formula (15).

Steps E-G: Obtain $K_e$=0.00031 cm min⁻¹ according to formula (16), for a known value of $K_e$, fit time series data of the cumulative infiltration amount according to formula (17) to obtain a sorptivity of 0.1371 cm min⁻⁰·⁵, and obtain an air-entry suction value of 36.98 cm according to formula (18).

(2) In case where a ring cutter has a height of 5 cm, and a soil sample is in a texture of silty soil, set a lower boundary pressure to −20.75 cm in a one-dimensional water upward infiltration experiment.

Based on the above calculation parameters, the calculation process of soil hydraulics properties is as follows.

Step A: During a one-dimensional water upward infiltration experiment for a silty soil sample under a boundary condition of a constant pressure, record data about the cumulative infiltration amount and infiltration time, a time $t_e$=1913 s for the wetting front to reach the upper surface of the soil sample, and measure a saturated hydraulic conductivity $K_s$=0.011 cm min⁻¹ of the soil sample.

Steps B-D: According to the time for the wetting front to reach the upper surface of the soil sample, query the data about the cumulative infiltration amount and infiltration time to obtain a cumulative infiltration amount $I_{te}$=1.981 cm and an advancing distance $z_{fte}$=5 cm of the wetting front, obtain U=0.396 according to formula (8), obtain α=0.193 according to formula (14), and obtain the soil pore size distribution index (0.186) of the soil sample according to formula (15).

Steps E-G: Obtain $K_e$=0.0037 cm min⁻¹ according to formula (16), for a known value of $K_e$, fit time series data of the cumulative infiltration amount according to formula (17) to obtain a sorptivity of 0.3593 cm min⁻⁰·⁵, and obtain an air-entry suction value of 19.58 cm according to formula (18).

(3) In case where a ring cutter has a height of 5 cm, and a soil sample is in a texture of sandy soil, set a lower boundary pressure to −14.66 cm in a one-dimensional water upward infiltration experiment.

Based on the above calculation parameters, the calculation process of soil hydraulics properties is as follows.

Step A: During a one-dimensional water upward infiltration experiment for a silty soil sample under a boundary condition of a constant pressure, record data about the cumulative infiltration amount and infiltration time, a time $t_e$=694 s for the wetting front to reach the upper surface of the soil sample, and measure a saturated hydraulic conductivity Ks=0.043 cm min⁻¹ of the soil sample.

Steps B-D: According to the time for the wetting front to reach the upper surface of the soil sample, query the data about the cumulative infiltration amount and infiltration time to obtain a cumulative infiltration amount $I_{te}$=1.522 cm and an advancing distance $z_{fte}$=5 cm of the wetting front, obtain U=0.304 according to formula (8), obtain α=0.255 according to formula (14), and obtain the soil pore size distribution index (0.290) of the soil sample according to formula (15).

Steps E-G: Obtain $K_e$=0.0156 cm min⁻¹ according to formula (16), for a known value of $K_e$, fit time series data of the cumulative infiltration amount according to formula (17)

to obtain a sorptivity of 0.4714 cm min$^{-0.5}$, and obtain an air-entry suction value of 12.94 cm according to formula (18).

(4) In case where a ring cutter has a height of 10 cm, and a soil sample is in a texture of clay soil, set a lower boundary pressure to −37.31 cm in a one-dimensional water upward infiltration experiment.

Based on the above calculation parameters, the calculation process of soil hydraulics properties is as follows.

Step A: During a one-dimensional water infiltration experiment for a clay soil sample under a boundary condition of a constant pressure, record data about the cumulative infiltration amount and infiltration time, a time $t_e$=539 min for the wetting front to reach the upper surface of the soil sample, and measure a saturated hydraulic conductivity $K_s$=0.001 cm min$^{-1}$ of the soil sample.

Steps B-D: According to the time for the wetting front to reach the upper surface of the soil sample, query the data about the cumulative infiltration amount and infiltration time to obtain a cumulative infiltration amount $I_{te}$=3.059 cm and an advancing distance $z_{fte}$=10 cm of the wetting front, obtain. U=0.306 according to formula (8), obtain α=0.143 according to formula (14), and obtain the soil pore size distribution index (0.123) of the soil sample according to formula (15).

Steps E-G: Obtain $K_e$=0.00031 cm min$^{-1}$ according to formula (16), for a known value of $K_e$, fit time series data of the cumulative infiltration amount according to formula (17) to obtain a sorptivity of 0.1371 cm min$^{-0.5}$, and obtain an air-entry suction value of 36.36 cm according to formula (18).

(5) In case where a ring cutter has a height of 10 cm, and a soil sample is in a texture of silty soil, set a lower boundary pressure to −20.75 cm in a one-dimensional water upward infiltration experiment.

Based on the above calculation parameters, the calculation process of soil hydraulics properties is as follows.

Step A: During a one-dimensional water upward infiltration experiment for a silty soil sample under a boundary condition of a constant pressure, record data about the cumulative infiltration amount and infiltration time, a time $t_e$=138 min for the wetting front to reach the upper surface of the soil sample, and measure a saturated hydraulic conductivity Ks=0.011 cm min$^{-1}$ of the soil sample.

Steps B-D: According to the time for the wetting front to reach the upper surface of the soil sample, query the data about the cumulative infiltration amount and infiltration time to obtain a cumulative infiltration amount $I_{te}$=3.926 cm and an advancing distance $z_{fte}$=10 cm of the wetting front, obtain U=0.393 according to formula (8), obtain α=0.204 according to formula (14), and obtain the soil pore size distribution index (0.203) of the soil sample according to formula (15).

Steps E-G: Obtain $K_e$=0.0038 cm min$^{-1}$ according to formula (16), for a known value of $K_e$, fit time series data of the cumulative infiltration amount according to formula (17) to obtain a sorptivity of 0.3638 cm min$^{-0.5}$, and obtain an air-entry suction value of 19.77 cm according to formula (18).

(6) in case where a ring cutter has a height of 10 cm, and a soil sample is in a texture of sandy soil set, a lower boundary pressure to −14.66 cm in a one-dimensional water upward infiltration experiment.

Based on the above calculation parameters, the calculation process of soil hydraulics properties is as follows.

Step A: During a one-dimensional water upward infiltration experiment for a silty soil sample under a boundary condition of a constant pressure, record data about the cumulative infiltration amount and infiltration time, a time $t_e$=54 min for the wetting front to reach the upper surface of the soil sample, and measure a saturated hydraulic conductivity Ks=0.043 cm min$^{-1}$ of the soil sample.

Steps B-D: According to the time for the wetting front to reach the upper surface of the soil sample, query the data about the cumulative infiltration amount and infiltration time to obtain a cumulative infiltration amount $I_{te}$=2.992 cm and an advancing distance $z_{fte}$=10 cm of the wetting front, obtain U=0.299 according to formula (8), obtain α=0.275 according to formula (14), and obtain the soil pore size distribution index (0.333) of the soil sample according to formula (15).

Steps E-G: Obtain $K_e$=0.0161 cm min$^{-1}$ according to formula (16), for a known value of $K_e$, fit time series data of the cumulative infiltration amount according to formula (17) to obtain a sorptivity of 0.4758 cm min$^{-0.5}$, and obtain an air-entry suction value of 13.51 cm according to formula (18).

From the above six specific calculation results (Table 2 shows the comparison between the soil hydraulic properties calculated based on the present disclosure and tested soil parameters), it can be seen that there is little difference between the soil hydraulic properties calculated by the present disclosure and the tested soil parameters. For the soil pore size distribution indexes obtained from the two methods, a maximum error between them is only 0.032, which occurs in the sandy soil with the ring cutter having a height of 5 cm; for the sorptivity obtained from the two methods, they are almost the same; for the air-entry suction values, the maximum error between them is only 1.72 cm, which occurs in the sandy soil with the ring cutter having a height of 5 cm. Therefore, based on the one-dimensional water upward infiltration experiment of homogeneous dry soil under a boundary condition of a constant pressure, the present disclosure can accurately predict the hydraulic properties of cutting ring soil sample, especially with fine soil texture.

TABLE 2

| Soil texture | n | n' | n" | s cm min$^{-0.5}$ | s' | s" | $h_d$ | $h_d'$ cm | $h_d"$ |
|---|---|---|---|---|---|---|---|---|---|
| Sandy soil | 0.322 | 0.290 | 0.333 | 0.4759 | 0.4714 | 0.4758 | 14.66 | 12.94 | 13.51 |
| Silty soil | 0.211 | 0.186 | 0.203 | 0.3742 | 0.3593 | 0.3628 | 20.75 | 19.58 | 19.77 |
| Clay soil | 0.131 | 0.120 | 0.123 | 0.1413 | 0.1371 | 0.1371 | 37.31 | 36.98 | 36.36 |

Note:
the meanings of the parameters in this Table are denoted above, where n', s' and $h_d'$ denote estimation parameters for a soil sample with a ring cutter height of 5 cm, and n", s" and $h_d"$ denote estimation parameters for a soil sample with a ring cutter height of 10 cm.

According to the above technical solution, a method for predicting soil hydraulic properties based on an upward infiltration experiment of cutting ring soil sample is designed. According to the new design approach, based on an inverse process of one-dimensional water upward infiltration of homogeneous dry soil under a boundary condition of a constant pressure, by recording the data regarding a cumulative infiltration amount and a infiltration time during the upward infiltration process of the cutting ring soil sample and a time for the wetting front to reach the upper surface of the cutting ring soil sample, a saturated hydraulic conductivity of the cutting ring soil sample is measured, and the soil hydraulic properties are quickly obtained. The present disclosure overcomes the defects that the methods in the prior art for measuring soil hydraulic properties are time consuming, low in efficiency, and not suitable for rapid acquisition of large area in the field, avoids the problems of multiple solutions and non-convergence of parameters, and improves the efficiency of acquiring soil hydraulic properties, thereby providing an effective means for the investigation of soil hydraulic properties in a large area in the field.

Although the embodiments of the present disclosure are described in detail above in conjunction with the drawings, the present disclosure is not limited to the above-described embodiments, and various changes may be made without departing from the spirit of the present disclosure within the knowledge of those skilled in the art.

What is claimed is:

1. A method for predicting soil hydraulic properties based on an upward infiltration experiment of a cutting ring soil sample, comprising the following steps:

step A: during a one-dimensional water upward infiltration experiment of homogeneous dry soil for the cutting ring soil sample under a boundary condition of a constant lower boundary pressure $h_p$, recording a change of a cumulative infiltration amount I of the cutting ring soil sample with infiltration time t, and an infiltration time $t_e$ for a wetting front in soil to reach an upper surface of the cutting ring soil sample, measuring a saturated hydraulic conductivity $K_s$ of the cutting ring soil sample, and proceeding to step B;

step B: according to the change of the cumulative infiltration amount I of the cutting ring soil sample over the infiltration time t, obtaining a cumulative infiltration amount $I_{te}$, and an advancing distance $z_{fte}$ of the wetting front in soil at a time $t_e$, as well as a ratio of $z_{fte}$ to $I_{te}$, namely, an average soil moisture content increase U in a wetting region of the cutting ring soil sample, and proceeding to step C;

step C: obtaining a shape coefficient a of a soil moisture profile of the cutting ring soil sample based on a saturated soil moisture content $\theta_s$, an initial soil moisture content $\theta_i$ and a residual soil moisture content $\theta_r$ of the cutting ring soil sample, as well as the average soil moisture content increase U in the wetting region of the cutting ring soil sample, and proceeding to step D; and step D: according to the shape coefficient a of the soil moisture profile of the cutting ring soil sample, obtaining a soil pore size distribution index n of the cutting ring soil sample;

wherein in step D, according to the shape coefficient a of the soil moisture profile of the cutting ring soil sample, and in combination with the following formula:

$$a = \frac{n(2n+3)}{(2n+2)(2n+1)}$$

the soil pore size distribution index n of the cutting ring soil sample is obtained using a fixed-point iteration method.

2. The method for predicting soil hydraulic properties based on an upward infiltration experiment of a cutting ring soil sample according to claim 1, wherein after step D is executed, the method further comprises the following steps:

step E: obtaining an effective saturated hydraulic conductivity $K_e$ of the cutting ring soil sample according to the soil pore size distribution index n of the cutting ring soil sample, the saturated hydraulic conductivity $K_s$ of the cutting ring soil sample, the saturated soil moisture content $\theta_s$, the initial soil moisture content $\theta_i$, and the residual soil moisture content $\theta_r$ of the cutting ring soil sample, and the shape coefficient a of the soil moisture profile of the cutting ring soil sample, and proceeding to step F; and step F: obtaining a sorptivity s of the cutting ring soil sample according to the effective saturated hydraulic conductivity $K_e$ of the cutting ring soil sample, and the change of the cumulative infiltration amount I of the cutting ring soil sample over the infiltration time t.

3. The method for predicting soil hydraulic properties based on an upward infiltration experiment of a cutting ring soil sample according to claim 2, wherein in step E, by substituting the soil pore size distribution index n of the cutting ring soil sample, the saturated hydraulic conductivity $K_s$ of the cutting ring soil sample, the saturated soil moisture content $\theta_s$, the initial soil moisture content $\theta_i$, and the residual soil moisture content $\theta_r$ of the cutting ring soil sample and the shape coefficient a of the soil moisture profile of the cutting ring soil sample into the following formula:

$$K_e = \frac{(a+1)(\theta_s - \theta_i)}{[(am/n+1][\theta_s - \theta_i - a(\theta_i - \theta_r)]} K_s$$

the effective saturated hydraulic conductivity $K_e$ of the cutting ring soil sample is obtained, wherein m=3n+2.

4. The method for predicting soil hydraulic properties based on an upward infiltration experiment of a cutting ring soil sample according to claim 2, wherein in step F, by substituting the effective saturated hydraulic conductivity $K_e$ of the cutting ring soil sample, and the change of the cumulative infiltration amount I of the cutting ring soil sample over the infiltration time t into the following formula:

$$t = -\frac{I}{K_e} - \frac{s^2}{2K_e^2} \ln\left(1 - \frac{2K_e}{s^2}I\right)$$

the sorptivity s of the cutting ring soil sample is obtained through a fitting operation.

5. The method for predicting soil hydraulic properties based on an upward infiltration experiment of a cutting ring soil sample according to claim 2, wherein after step F is executed, the method further comprises the following step:

step G: by substituting the sorptivity s of the cutting ring soil sample, the soil pore size distribution index n of the cutting ring soil sample, the saturated soil moisture content $\theta_s$ of the cutting ring soil sample, the initial soil moisture content $\theta_i$ of the cutting ring soil sample, the saturated hydraulic conductivity $K_s$ of the cutting ring soil sample and the constant lower boundary pressure $h_p$ into the following formula:

$$h_d = \begin{cases} \dfrac{(3n+1)s^2}{2K_s(\theta_s - \theta_i)} & h_p \le -h_d \\ \dfrac{m-1}{m}\left(\dfrac{s^2}{2K_s(\theta_s - \theta_i)} - h_p\right) & h_p > -h_d \end{cases}$$

an air-entry suction value $h_d$ of the cutting ring soil sample is obtained, wherein $m=3n+2$.

6. The method for predicting soil hydraulic properties based on an upward infiltration experiment of a cutting ring soil sample according to claim 1, wherein in step C, by substituting the saturated soil moisture content $\theta_s$, the initial soil moisture content $\theta_i$ and the residual soil moisture content $\theta_r$ of the cutting ring soil sample, as well as the average soil moisture content increase U in the wetting region of the cutting ring soil sample into the following formula:

$$a = \frac{\theta_s - \theta_i - U}{\theta_i + U - \theta_r}$$

the shape coefficient a of the soil moisture profile of the cutting ring soil sample is obtained.

* * * * *